US006132619A

United States Patent [19]
Lin et al.

[11] Patent Number: 6,132,619
[45] Date of Patent: Oct. 17, 2000

[54] RESOLUTION OF SLUDGE/EMULSION FORMED BY ACIDIZING WELLS

[75] Inventors: Huei-Nan (Leo) Lin, Houston, Tex.; Rodney Davis Martin, Lafayette, La.; James M. Brown, Magnolia; Gene F. Brock, The Woodlands, both of Tex.

[73] Assignee: BJ Services Company, Houston, Tex.

[21] Appl. No.: 08/984,939

[22] Filed: Dec. 4, 1997

Related U.S. Application Data

[60] Provisional application No. 60/032,778, Dec. 5, 1996.

[51] Int. Cl.[7] ........................................................ C02F 9/00
[52] U.S. Cl. ............................ 210/662; 210/668; 210/669; 210/693
[58] Field of Search ....................... 166/265, 267, 166/307; 210/662, 668, 669, 692, 693, 708, 719, 727, 728, 733, 747, 757; 507/933

[56] References Cited

U.S. PATENT DOCUMENTS

| | | | |
|---|---|---|---|
| 4,451,377 | 5/1984 | Luxemburg | 210/708 |
| 4,818,410 | 4/1989 | Bellos et al. | 210/639 |
| 4,839,054 | 6/1989 | Ruebush et al. | 210/639 |
| 4,855,060 | 8/1989 | Durham et al. | 210/708 |
| 5,021,164 | 6/1991 | Gay | 210/694 |
| 5,104,545 | 4/1992 | Means et al. | 210/669 |
| 5,445,221 | 8/1995 | Vinson | 166/307 |
| 5,674,817 | 10/1997 | Brezinski et al. | 507/933 |

FOREIGN PATENT DOCUMENTS

0 432 787 A1   6/1991   European Pat. Off. .......... C02F 1/28

OTHER PUBLICATIONS

European Search Report for EP 90124160.4 dated Jul. 3, 1991.
Summary Bulletin Amberlite® Polymeric Adsorbents, Rohm and Haas Company Technical Bulletin Fluid Process Chemicals, pp. 1–11 (1978).
Amberlite® XAD–4—*Product Description*, Rohm and Haas Company (Jun. 1993).

Simpson, Richard M., *The Separation of Organic Chemicals From Water*, Rohm and Haas Company (Presented at the Third Symposium of the Institute of Advanced Sanitation Research International on Thursday, Apr. 13, 1972).

Treating Oil Field Emulsions, Chapter XI Testing Procedures (Third Edition) by Petroleum Extension Service, The University of Texas at Austin, Texas and American Petroleum Institute, Division of Production, Dallas, Texas (1974).

Gutkowski, Bogdan and Jan Hupka, Microprocessor Controlled Oil/Water Separator, Environment Protection Engineering, vol. 14, No. 3–4 (1988).

Hudgins, Jr., C.M., Chemical Treatments and Usage in Offshore Oil and Gas Production Systems, JPT, pp. 604–611 (May 1992).

Ho, S.V., *A New Membrane Process for Recovering Organics From Aqueous Wastes*, Monsanto Company, St. Louis, MO.

Stephenson, M.T., Components of Produced Water: A Compilation of Industry Studies, JPT, pp. 548–603 (May 1992).

(List continued on next page.)

*Primary Examiner*—Ivars Cintins
*Attorney, Agent, or Firm*—Howrey Simon Arnold & White, LLP

[57] ABSTRACT

A method for resolving sludge/emulsion formed as a result of acidization of oil and gas wells comprising the steps of adding an iron-control chemical in an amount sufficient to prevent the formation of insoluble iron compounds, and adding a water-dispersible emulsion breaker in an amount sufficient to separate the sludge/emulsion into clean oil and water. Further treatment of the waste water with water clarifiers, settling vessels and passing it through a macroreticular resin results in water that is at least less than 29 mg/L total oil and grease for overboard discharges from offshore facilities.

24 Claims, 1 Drawing Sheet

OTHER PUBLICATIONS

Yadav, B.D., et al., Effectiveness of Induced Air Flotation in Oil Removal From Oilfield Wastewater, Indian Journal Environmental Protection [Kalpana Corporation], vol. 10, No. 11, pp. 820–823 (1990).

Ohlsen, J.R., *Dissolved Organics Removal*, Betz Energy Chemicals, Inc. (Feb. 1990).

Webb, Chris, Separating Oil From Water, The Chemical Engineer, pp. 19–24 (Apr. 11, 1991).

Tugtepe, Mualla and A. Sukru Cagatay, The Use of Organosilicon Polymers In Coagulation And Contact Flocculation–Filtration, Department of Chemical Engineering, Istanbul University, Istanbul, Turkey (Feb. 1989).

Angbo, L., et al., Adsorption Of Humic Substances Onto Prebuilt Flocs, Water Supply, vol. 9, pp. 87–01, (1991).

Holsen, Thomas H, et al. Removal of Sparingly Soluble Organic Chemicals From Aqueous Solutions With Surfactant–Coated Ferrihydrite, Environment Science Technology, vol. 25, No. 9. pp. 1585–1589 (1991).

Bache, D. H., et al. Optimum Coagulation Conditions For A Coloured Water In Terms Of Floc Size, Density And Strength, Water Supply, vol. 9, pp. 93–102 (1991).

Chen, A.S.C., et al., Removal Of Oil, Grease, And Suspended Solids From Produced Water With Ceramic Cross-flow Microfiltration, SPE Production Engineering, pp. 131–136 (May 1991).

Kim, Philip H.–S. and James M. Symons, Using Anion Exchange Resins To Remove THM Precursors, Journal AWWA, pp. 61–68 (Dec. 1991).

RESOLUTION OF SLUDGE/EMULSION FORMED BY ACIDIZING WELLS

RELATED APPLICATIONS

This application claims the benefit of prior filed U.S. Provisional Application No. 06/032,778, filed Dec. 5, 1996, now abandoned, entitled "Resolution of Sludge/Emulsion Formed by Acidizing Wells."

BACKGROUND OF THE INVENTION

This invention relates to a novel process for resolving sludge/emulsion formed as a result of oil and gas well acidization, and a process for treating the resulting produced water to improve water quality sufficiently to allow water disposal offshore. More particularly, the invention relates to a method for removing soluble and insoluble organic material from aqueous fluids produced from subterranean formations during flowback after acid stimulation treatments to meet overboard water quality requirements of 29 ppm total oil and grease. The method comprises treating separated water from acid returns with a water clarifier and allowing the clarified water to separate from the skimmings in a settling vessel. The water from this vessel is further processed through a prefilter to remove any solids or residual free oil and then is treated by filtration through a macroreticular resin media to remove soluble organic material originating from the stimulation package. The cleaned water is then disposed of by pumping it into an overboard disposal line.

Periodically oil and gas wells are cleared of calcium carbonate buildup and other debris by a process called acidizing. When a well is acidized, production is shut down and acid is flushed under pressure through the well and into the reservoir. After acidizing is complete and production recommences, spent acid may come back up through the well and cause the formation of sludge/emulsion. Sludge/emulsion formation may be minimal on initial flowback, but as production fluids mix downhole with spent acid, additional sludge/emulsion may be formed. Sludge/emulsion formation may also occur when this acid flowback is commingled with the production from other wells.

Crude oil dehydration treating systems are typically used to reduce the basic silt, sediment, and water (BS&W) of crude oil to a certain acceptable level specified by a crude oil purchaser, typically a pipeline company. The level of BS&W typically specified by purchasers is less than 1%. A typical crude oil dehydration treating system is includes a separator, free water knockout, heater treater or chemelectric, and/or air flotation unit, etc. Such systems are well known in the art.

If a sludge/emulsion problem is not resolved promptly, it will cause a malfunction in the crude oil dehydration treating system. This type of malfunction is commonly referred to as a system upset. When a system upset occurs in the treating system, the required BS&W level cannot be achieved to meet a purchaser's specifications. Additionally, high levels of oil and other organic material will remain in the waste water from the system which prevents the waste water from meeting water quality specifications for release at sea. The chemicals and systems used for normal oil water separation and processing are not adequate to resolve the sludge/emulsion formed from acidizing oil and gas wells.

To date, the typical method of coping with the possibility of a system upset is to mechanically remove the sludge/emulsion by catching it in large storage tanks. Removal and treatment of sludge/emulsion is a major operational cost for producers. This is particularly true for offshore wells because the sludge/emulsion must be collected, stored, and transported to shore for treatment and disposal.

Conventional methods of removing sludge/emulsion formation include neutralizing acid flowback by raising the pH of the production fluid and subsequently adding emulsion breakers or other related chemicals. Problems exist with conventional sludge/emulsion treatment. The process is slow and the resulting produced water contains such a high oil content that it cannot be discharged due to environmental concerns.

There is a need for an efficient process to resolve the sludge/emulsion formed when acidizing oil/gas wells and to clean the resulting waste water sufficient to meet environmental regulations for discharging. The present invention meets this need.

SUMMARY OF THE INVENTION

The present invention is directed to a method for treating an emulsion such as an iron containing sludge/emulsion, which comprises adding an iron-control chemical in combination with an emulsion breaker. More particularly, a composition including an iron-control chemical and water-dispersible emulsion breaker may be used. This method may be utilized downhole proximate the subterranean formation or may be used in conjunction with surface treating facilities. The iron-control chemical is added in an amount sufficient to prevent oxidation of ferrous iron to ferric iron and in an amount sufficient to reduce already present ferric iron to ferrous iron. The iron-control chemical may include chelating agents and iron reducing agents. Iron-control chemicals may include salts containing bisulfite ion, thioglycolic acid, sodium or potassium salts of ethylenediaminetetraacetic acid, sodium or potassium salts of hydroxyethylethylenediaminetetraacetic acid, or sodium or potassium salts of nitrilotriacetic acid. Emulsion breakers may include dodecylbenzylsulfonic acid, the sodium salt of xylenesulfonic acid, alkyoxylated compounds, anionic cationic and nonionic surfactants, and resins. (The term resin here refers to a class of demulsifiers called resins and should not be confused with macroreticular resins used in this invention).

The water-dispersible emulsion breaker is added to the sludge/emulsion in an amount sufficient to separate the sludge/emulsion into water and oil. The water may be further treated with a water clarifier, a prefiltering process, and a resin separation process. A macroreticular resin may be used for the resin separation process. The resins may include phenolic and epoxide resins. The water clarifier may be added in an amount sufficient to clarify the water to contain less than about 29 milligrams/liter (mg/L) of organic material, a purity adequate for discharge at sea. Such discharge would not create a sheen on the water. The water clarifier may include organic polymers such as polyacrylic acid, acrylic acid based polymers, acrylamide based polymers, polymerized amines, alkanolamines, thiocarbamates cationic polymers or inorganic salts such as alum, aluminum chloride, or aluminum chlorohydrate.

DETAILED DESCRIPTION OF THE INVENTION

Figure 1:
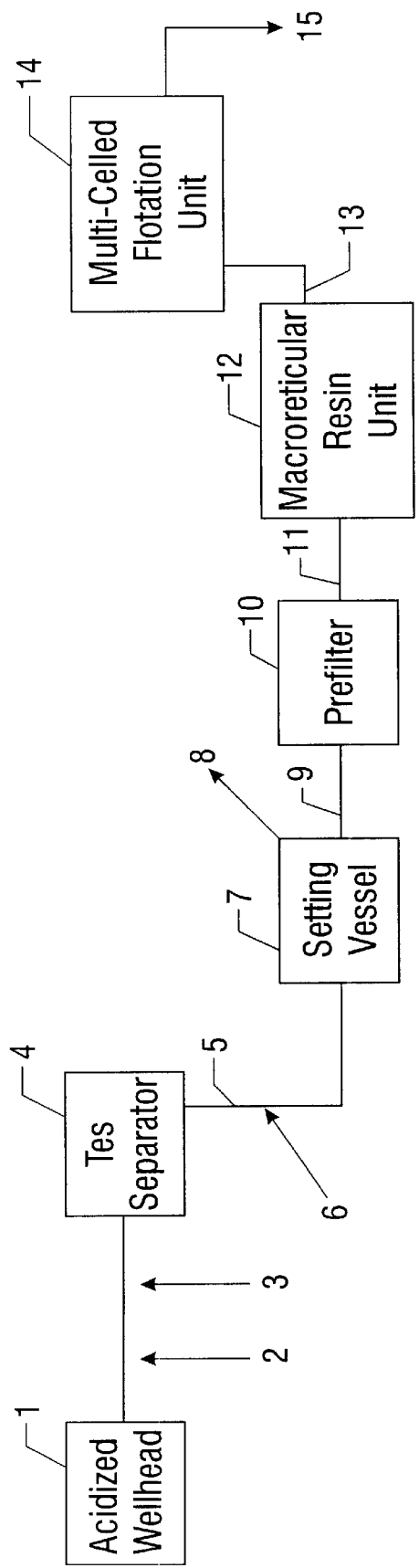
FIG. 1 illustrates a flow chart of an embodiment of the invention.

The present invention alleviates the problems encountered in conventional sludge/emulsion treatment by use of a combination of iron-control chemicals and extremely water-dispersible emulsion breakers followed by a separation system.

Addition of Iron-Control Chemicals and Emulsion Breakers

An optimum time to begin adding iron-control chemicals and emulsion breakers is shortly before acid flowback starts. Beginning treatment at this production stage reduces the tendency of solids or scale to build-up in sludge/emulsion and removes solids or scale in the production fluid.

Referring to FIG. 1, iron control chemicals and emulsion breakers may be added to the sludge/emulsion from an acidized well (1) either at the wellhead (1) or at points (2) and (3) respectively, before the sludge/emulsion enters the separator vessel (4). Adding additional emulsion breakers or a water clarifier (6) may be required in some cases to completely resolve the emulsion and produce oil-free water. These may be added in the line (5) leading from the separator (4) to a settling vessel (7). Treatment may include allowing the water and water clarifier to pass through a settling vessel (7) in which the clarified water separates from the skimmings.

Alternatively, iron-control chemicals and emulsion breakers may be added down hole provided the well is equipped with downhole injection equipment. An example of such downhole injection equipment would include capillary tubing attached to the production tubing. The injection of the iron-control chemicals and emulsion breakers downhole may be commenced upon flowback of the spent acid.

The Separation Process

Referring to FIG. 1, the water from the settling vessel (7) may be further processed by passing it through a prefilter (10). Prefiltering prevents free oil or solids from fouling a macroreticular resin (12), which may be used for further purification. The water is pumped from the settling vessel (7) through the prefilter and then through the macroreticular resin. The macroreticular resin may be contained in a macroreticular resin unit (12).

After passing the water through the macroreticular resin, the treated water is analyzed to determine if it is of sufficient purity for discharge at sea (15) based on environmental regulatory requirements. Current regulatory standards require the treated water to include less than 29 mg/L total oil and grease. This may be determined by analyzing a sample of the water by the procedure described in Example 5. If the water is not of sufficient purity for discharge into the sea, the water can be pumped into a holding tank and recycled back through the settling vessel, whereafter the prefiltering and macroreticulate resin filtering steps may be repeated. This process is repeated until the water is of sufficient purity for discharge into the sea.

Discharge may be accomplished through overboard disposal lines or by entering one of the cells of a multi-celled flotation unit where the bulk production water is treated from all of the non-acidized wells on the offshore platform (14). Oil and other materials removed from the water may be recirculated (8) in the production system with the oil from the wellhead (1) and treated using conventional methods (not illustrated in FIG. 1).

Iron-Control Chemicals

Iron-control chemicals prevent the formation of particulate insoluble iron salts by complexing or chelating ferrous iron or reducing ferric iron to ferrous iron. Iron-control chemicals also prevent the oxidation of ferrous to ferric iron. Ferrous iron is commonly found in sludge/emulsion formed from acidizing oil and gas wells. Iron in the sludge/emulsion is believed to come from naturally occurring iron in the subterranean formation or from iron in tubular goods used in the drilling and/or production of the well. Iron-control chemicals enable emulsion breakers to resolve sludge/emulsion more promptly than with conventional methods by converting ferric iron to ferrous iron or preventing the formation of ferric iron. In aqueous solution, ferric iron is insoluble and aggravates resolution of the sludge/emulsion.

Preferred iron-control chemicals include thioglycolic acid. Other preferred iron-control chemicals include chelating agents such as sodium or potassium salts of hydroxyethylenediaminetetraacetic acid (EDTA), sodium or potassium salts of hydroxyethylethylenediaminetetraacetic acid (HEEDTA), or sodium or potassium salts of nitrilotriacetic acid (NTA) and salts containing bisulfite ions such as sodium bisulfite, ammonium bisulfite, potassium bisulfite.

The amount of iron-control chemical that is required to resolve sludge/emulsion is dependent on the amount of ferrous and ferric iron present in the total production fluid, but may range from about 500 to about 10,000 ppm of iron-control chemical. The higher the total iron content, the more iron-control chemical required. By way of example, the initial treatment of the iron-control chemical may be estimated at 1000 ppm and thereafter, the amount of iron-control chemical may be adjusted based on a determination of BS&W from a sample taken at the test separator (FIG. 1, item 4). If the BS&W determination is greater than desired, more iron-control chemical may be added at (2). The determination of BS&W may be based on the methods presented in Example 6.

Emulsion Breakers

Preferred emulsion breakers include dodecylbenzylsulfonic acid (DDBSA), the sodium salt of xylenesulfonic acid (NAXSA), expoxlated and propoxylated compounds, anionic cationic and nonionic surfactants, and resins, such as phenolic and epoxide resins. An example of a most preferred water-dispersible emulsion breaker that may be used is a combination of DDBSA and NAXSA.

Emulsion breaker is preferably added either at the wellhead or at a point before or at the separator vessel. The amount of water-dispersible emulsion breaker chemical required to resolve sludge/emulsion is highly dependent upon the amount of oil and water produced by the well, degree of agitation, concentration of chemicals used in the acidizing process, ratio of acid returns to normal production and the iron content in the produced fluid. Typically, about 125 to 5,000 ppm of water-dispersible emulsion breaker to total produced fluid is used. By way of example, the initial treatment of the water-dispersible emulsion breaker may be estimated at 250 ppm, and thereafter the amount of water-dispersible emulsion breaker may be adjusted based on a determination of BS&W from a sample taken from the test separator (FIG. 1, item 4). If the BS&W determination is greater than desired, more emulsion breaker is added at (3). The determination of BS&W may be made based on the methods presented in Example 6.

Water Clarifiers

Separated water from acid returns may be treated with about 1000 to about 100,000 ppm of water clarifier, most preferably a high molecular weight partially crosslinked polyacrylic acid of nominal molecular weight of 2,000,000 to 3,000,000 daltons in an oil external emulsion. By way of example, the initial amount of the water clarifier may be estimated at 5,000 ppm, and thereafter the amount of clarifier may be adjusted based on testing methods described in Example 3. Preferred water clarifiers include inorganic metal salts such as alum, aluminum chloride, and aluminum chlorohydrate or organic polymers such as acrylic acid based polymers, acrylamide based polymers, polymerized amines, alkanolamines, thiocarbamates, and cationic polymers such as diallyldimethylammonium chloride (DADMAC).

Prefiltering

Prefiltering prevents free oil or solids from fouling a macroreticular resin which may be used for further purification. Any prefilter commonly used in the industry may be used including a cotton or synthetic cloth membrane filter of nominal 10 micron pore size. After prefiltering, the water may be treated by passing it through a macroreticular resin media.

Macroreticular Resins

The macroreticular resin media removes soluble organic material that may have been present in the water phase such as corrosion inhibitors, mutual solvents, and surfactants that may be added to the acid package during stimulation as well as naturally occurring soluble organic compounds and insoluble hydrocarbons. Macroreticular resin media are polymeric adsorbents which are hard polymerized insoluble copolymer beads that have high porosity and high surface area. A preferred macroreticular resin media is Amberlite XAD series available commercially from Rohm and Haas. Macroreticular resin media is reusable and regenerable on site. Another commonly used adsorbent for treating water to remove organic compounds is granulated activated carbon, but granulated activated carbon cannot be as easily regenerated after use as macroreticular resin.

The following examples will illustrate the invention, but should not be construed to limit the scope thereof unless otherwise expressly noted.

EXAMPLE 1

Resin Testing of Water Phase without Chemical Treatment

Fifteen ml. of Amberlite XAD-2 (20–60 mesh) macroreticular resin was placed into a 30 ml. plastic syringe with a small tuft of glass wool in the bottom and top. Approximately 10 ml. of distilled water was passed through the resin prior to use.

Samples were taken from a wellhead during acid flow back and placed into a 2 liter container. The samples were allowed to settle for 15 minutes. A water sample was taken from the bottom of the settling vessel. The organic content of the water sample was measured by taking an infrared (IR) reading of a freon extract of the water sample. The reading was 381 ppm oil and grease Fifty ml. of this sample was allowed to flow through the resin in the syringe and then a second organic content measurement was taken by IR reading of a freon extract. The second reading was 322 ppm oil and grease. This example demonstrates that passing water containing high amounts of soluble and insoluble organic materials through macroreticular resin lowers the organic content of the water.

EXAMPLE 2

Water Clarifer Testing of Water with Chemical Treatment

Three liters of wellhead emulsion was combined with 5000 ppm of thioglycolic acid and 2500 ppm of a mixture containing DDBSA and NAXSA and allowed to settle in a separatory funnel. The oil layer was clean and bright and contained less than 0.5% basic silt, sediment, and water. Samples of the water layer were taken from the bottom of the separatory funnel and were combined with 10,000 and 5000 ppm of a high molecular crosslinked polyacrylic acid (A), and a high molecular weight noncrosslinked polyacrylic acid (B). The results were:

| 10,000 ppm A | clean, fast break |
| 5,000 ppm A | slower, not as clean as above |
| 10,000 ppm B | slow, clean looser floc |

The water that separated from the emulsion was chocolate brown in color. After the chocolate brown water was clarified with 10,000 ppm of polyacrylic acid, a thick floc developed which floated to the top leaving clear water below. This example demonstrates successful treatment of an emulsion sample from an acidized well flowback to yield acceptable oil quality and further successful treatment of the water layer to yield relatively clean water.

EXAMPLE 3

Resin Testing with Chemical Treatment and Clarification

A fresh sample of wellhead emulsion was combined with thioglycolic acid and a mixture of DDBSA and NAXSA as in the previous example. The water that subsequently separated was combined with 10,000 ppm of a high molecular crosslinked polyacrylic acid (A). The clarified water was then allowed to flow through a macroreticular resin and the organic content of the water was measured.

| Cumulative Volume Through Resin (ml) | Organic Content (ppm) |
|---|---|
| 0 (blank) | 103 |
| 50 | 59 |
| 190 | 59 |
| 250 | 37 |
| 410 | 44 |
| 590 | 37 |
| 830 | 52 |
| Fifty ml. of unclarified water was allowed to flow through a macroreticular resin to increase resin loading followed by 50 ml. of clarified water. (The resin was purposely fouled in this step to determine what the capacity of the resin was.) | |
| 930 | 52 |
| Fifty ml. of unclarified water was allowed to flow through a macroreticular resin to increase resin loading followed by passing 50 ml. of clarified water through the macroreticular resin. | |
| 1030 | 52 |

At the completion of this experiment, the resin bed was dirty brownish yellow in color. Fifty ml. of denatured alcohol was passed through the resin. The resin returned to its original white color and the effluent was highly colored and turbid. One hundred ml. of distilled water was flushed through the resin and another 50 ml. sample of clarified water was passed. The organic content of the clarified water after passing it through the macroreticular resin was 55 ppm.

The denatured alcohol was passed through the resin bed to regenerate the resin and return it to a clean state. The alcohol dissolved the captured organics from the resin and eluted as a dark viscous liquid. The resin turned from a dirty brown color to its original white color. This example demonstrates that passing water that has been separated from an acid flowback emulsion through a macroreticular resin can significantly reduce the organic content of the water even after it has been clarified with a polymeric clarifier.

EXAMPLE 4

Offshore Treatment of Produced Fluids After Acidizing of Multiple Wells

Produced fluids from three wells that had been acidized were combined with an iron-control agent (thioglycolic acid) and a water-dispersible emulsion breaker containing a mixture of DDBSA and NAXSA. The iron-control agents and emulsion breakers were added into the combined stream from the three wells upstream from a separation vessel. The oil taken off of the top of the separator contained less than 0.5% basic silt, sediment and water and could be combined with the remainder of the production from the offshore platform in the bulk oil treater.

The water from the bottom of the separation vessel was measured for total organic content by IR and found to contain from 900 to 974 ppm of organics. The pH of the water phase was less than 1.0 as measure by pH indicator paper. The water was combined with approximately 1000 ppm of polyacrylic acid as it exited the separation vessel and was allowed to flow into the top of a 50 bbl tank. The water was allowed to flow out of the bottom of the 50 bbl tank through a 10 micron polyester cartridge prefilter and into a process tower containing macroreticular resin. The water exiting the 50 bbl tank contained an average organic level of 120 ppm and the water exiting the macroreticular resin process tower contained 12 to 16 ppm total organic level measured by IR. This water was suitable for overboard discharge and was allowed to flow into the terminal cell of a multiple cell flotation unit and then overboard.

EXAMPLE 5

Test to Determine Whether Waste Water is of Sufficient Quality to be Disposed of Offshore 1. Scope and Application
1.1 This method includes the measurement of fluorocarbon-113 extractable matter from surface and saline waters, industrial and domestic wastes. It is applicable to the determination of hydrocarbons, vegetable oils, animal fats, waxes, soaps, greases and related matter.
1.2 The method is applicable to measurement of most light petroleum fuels, although loss of about half of any gasoline present during the extraction manipulations can be expected.
1.3 The method covers the range from 0.2 to 1000 mg/l of extractable material.
1.4 While this method can be used to obtain an estimate of the oil and grease that would be measured gravimetrically, in many cases the estimate more accurately describes the parameter, as it will measure volatiles more effectively and is not susceptible to interferences such as extractable sulfur. It can be used with the Petroleum Hydrocarbon procedure to obtain an oil and grease value and a petroleum hydrocarbon value on the same sample.
2. Summary of Method
2.1 The sample is acidified to a low pH (<2) and extracted with fluorocarbon-113. The oil and grease is determined by comparison of the infrared absorbance of the sample extract with standards.
3. Definitions
3.1 The definition of oil and grease is based on the procedure used. The source of the oil and/or grease, and the presence of extractable non-oily matter will influence the material measured and interpretation of results.
4. Sampling and Storage
4.1 A representative sample of 1 liter volume should be collected in a glass bottle. If analysis is to be delayed for more than a few hours, the sample is preserved by the addition of 5 ml HCl (6.1) at the time of collection and refrigerated at 4° C.
4.2 Because losses of grease will occur on sampling equipment, the collection of a composite sample is impractical. Individual portions collected at prescribed time intervals must be analyzed separately to obtain the average concentration over an extended period.
5. Apparatus
5.1 Separatory funnel, 2000 ml, with Teflon stopcock.
5.2 Infrared spectrophotometer, scanning. Non-scanning instruments may also be used but can be subject to positive interferences in complex chemical wastewaters.
5.3 Cells, 10 mm, 50 mm, and 100 mm path length, sodium chloride or infrared grade glass.
5.4 Filter paper, Whatman No. 40, 11 cm.
6. Reagents
6.1 Hydrochloric acid, 1:1. Mix equal volumes of conc. HCl and distilled water.
6.2 Fluorocarbon-113, (1,1,2-trichloro-1,2,2-trifluoroethane), b. p. 48° C.
6.3 Sodium sulfate, anhydrous crystal.
6.4 Calibration mixtures:
    6.4.1 Reference oil: Pipet 15.0 ml n-hexadecane, 15.0 ml isooctane, and 10.0 ml chlorobenzene into a 50 ml glass stoppered bottle. Maintain the integrity of the mixture by keeping stoppered except when withdrawing aliquots.
    6.4.2 Stock standard: Pipet 1.0 mil reference oil (6.4.1) into a tared 200 ml volumetric flask and immediately stopper. Weigh and dilute to volume with fluorocarbon-113.
    6.4.3 Working standards: Pipet appropriate volumes of stock standard (6.4.2) into 100 ml volumetric flasks according to the cell pathlength to be used. Dilute to volume with fluorocarbon-113. Calculate concentration of standards from the stock standard.
7. Procedure
7.1 Mark the sample bottle at the water meniscus for later determination of sample volume. If the sample was not acidified at time of collection, add 5 ml hydrochloric acid (6.1) to the sample bottle. After mixing the sample, check the pH by touching pH-sensitive paper to the cap to insure that the pH is 2 or lower. Add more acid if necessary.
7.2 Pour the sample into a separatory funnel.
7.3 Add 30 ml fluorocarbon-113 (6.2) to the sample bottle and rotate the bottle to rinse the sides. Transfer the solvent into the separatory funnel. Extract by shaking vigorously for 2 minutes. Allow the layers to separate.
7.4 Filter the solvent layer into a 100 ml volumetric flask through a funnel containing solvent-moistened filter paper.
NOTE: An emulsion that fails to dissipate can be broken by pouring about 1 g sodium sulfate (6.3) into the filter paper cone and slowly draining the emulsion through the salt. Additional 1 g portions can be added to the cone as required.
7.5 Repeat (7.3 and 7.4) twice more with 30 ml portions of fresh solvent, combining all solvent in the volumetric flask.

7.6 Rinse the tip of the separatory funnel, filter paper, and the funnel with a total of 5–10 ml fluorocarbon-113 and collect the rinsings in the flask. Dilute the extract to 100 ml, and stopper the flask.

7.7 Select appropriate working standards and cell pathlength according to the following table of approximate working ranges:

| Pathlength | Range |
|---|---|
| 10 mm | 2–40 mg |
| 50 mm | 0.4–8 mg |
| 100 mm | 0.1–4 mg |

7.8 Scan standards and samples form 3200 $cm^{-1}$ to 2700 $cm^{-1}$ with fluorocarbon-113 in the reference beam and record the results on absorbance paper. The absorbances of samples and standards are measured by constructing a straight baseline over the range of the scan and measuring the absorbance of the peak maximum at 2930 $cm^{-1}$ and subtracting the baseline absorbance at that point. For an example of a typical oil spectrum and baseline construction, see Gruenfeld[3]. Non-scanning instruments should be operated according to manufacturer's instructions, although calibration must be performed using the standards described above (6.4). If the absorbance exceeds 0.8 for a sample, select a shorter pathlength or dilute as required.

7.9 Use a calibration plot of absorbance vs. mg oil prepared from the standards to determine the mg oil in the sample solution.

8. Calculation 8.1 mg/l total oil and grease=

$$mg/l \text{ total oil and grease} = \frac{R \times D}{V}$$

where:

R=oil in solution, determined from calibration plot, in milligrams.

D=extract dilution factor, if used.

V=volume of sample, determined by refilling sample bottle to calibration line and correcting for acid addition if necessary, in liters.

9. Precision and Accuracy 9.1 The two oil and grease methods in this manual were tested by a single laboratory (EMSL) on sewage. This method determined the oil and grease level in the sewage to be 17.5 mg/l. When 1 liter portions of the sewage were dosed with 14.0 mg of a mixture of #2 fuel oil and Wesson oil, the recovery was 99% with a standard deviation of ±1.4 mg/l.

BIBLIGRAPHY

1. Standard Methods for the Examination of Water and Wastewater, 14th Edition, p. 516, Method 502B (1975).
2. American Petroleum Institute, "Manual on Disposal of Refinery Wastes," Vol. IV, Method 733–58 (1958).
3. Gruenfeld, M., "Extraction of Dispersed Oils from Water for Quantitative Analysis by Infrared Spectroscopy," Environ, Sci. Technol. 7,636 (1973).

EXAMPLE 6

Test to Determine BS&W

After a representative sample has been obtained, the next operation is to determine the percent of water and sediment present. The following three testing methods, as described in this chapter, are paraphrased or quoted from API Standard: 2542, Standard Method of Test for Water and Sediment in Crude Oils.

1. Laboratory centrifuge method.
2. Field centrifuge method.
3. Field centrifuge method, 12.50-ml tube.

The API Standard also mentions the base method and gravity settling method.

It is generally agreed that the laboratory centrifuge method is the most accurate, but the field centrifuge method is usually employed when laboratory facilities are not available. The gravity settling method is less generally used, although it is employed in some areas. The base method is used when agreement cannot be reached between the buyer and seller using any of the other methods. The base method is also considered to be the standard and method of testing for crude oils that have characteristics not suitable for testing by the centrifuge method because it does not use centrifuges. The base method is employed in accordance with ASTM Method D95—Standard: 2560, Test for Water in Petroleum Products and Other Bituminois Materials and ASTM Method D473—API Standard: 2561, Test for Sediment in Crude and Fuel Oils by Extraction.

Field Centrifuge Method

A centrifuge should be capable of whirling two or more filled centrifuge tubes at a speed that can be controlled to give a relative centrifugal force of between 500 and 800 at the tip of the tubes. The revolving head, trunnion rings, and trunnion cups, including the cushion, should be soundly enough constructed to withstand the maximum centrifugal force capable of being delivered by the power source. The trunnion cups and cushions should firmly support the tubes when the centrifuge is in motion. The centrifuge should be enclosed by a metal shield or case strong enough to eliminate danger if any breakage occurs.

The speed of the rotating head is calculated by use of the following formula:

$$rpm = 25\sqrt{\frac{rcf}{d}}$$

where:

rpm=revolutions per minute rcf=relative centrifugal force d=diameter of swing in inches measured between the tips of opposite tubes when in rotating position.

The centrifuge tubes are 8 inches long, cone-shaped, and made of thoroughly annealed glass. While the use of the 8-inch tube is preferable, a cone-shaped 6-inch tube may be used. In both types, the graduations are numbered and should be clear and distinct. The mouth should be constricted in shape for closure with a cork. Scale error tolerances and smallest graduations between various calibration marks are given in table 4 for 8-inch tubes and in table 5 for 6-inch tubes. The tolerances apply to calibrations made with air-free water at 20° C., reading the bottom of a shaded miniscus. A pear-shaped centrifuge tube may also be used. Its specifications are similar to those of the 8-inch and 6-inch tubes as to material and tolerances.

When mutually agreeable, centrifuge tubes graduated in 200 parts and marked for direct reading in percent water and sediment may be used. They may be 6-inch tubes, either cone- or pear-shaped. These tubes are only used for testing with equal parts of solvent and oil.

TABLE 4

CALIBRATION TOLERANCES OF 8-INCH TUBES

| Range (ml) | Subdivision (ml) | Volume tolerance (ml) |
| --- | --- | --- |
| 0.0 to 0.1 | 0.05 | ±0.02 |
| 0.1 to 0.3 | 0.05 | ±0.03 |
| 0.3 to 0.5 | 0.05 | ±0.05 |
| 0.5 to 1.0 | 0.10 | ±0.05 |
| 1.0 to 2.0 | 0.10 | ±0.10 |
| 2.0 to 3.0 | 0.20 | ±0.10 |
| 3.0 to 5.0 | 0.50 | ±0.20 |
| 5.0 to 10 | 1.00 | ±0.50 |
| 10 to 25 | 5.00 | ±1.00 |
| 25 to 100 | 25.00 | ±1.00 |

TABLE 5

CALIBRATION TOLERANCES OF 6-INCH TUBES

| Range (ml) | Subdivision (ml) | Volume tolerance (ml) |
| --- | --- | --- |
| 0.0 to 0.1 | 0.05 | ±0.020 |
| 0.1 to 0.3 | 0.05 | +0.030 |
| 0.3 to 0.5 | 0.05 | +0.050 |
| 0.5 to 1.0 | 0.10 | +0.075 |
| 1.0 to 1.5 | 0.10 | +0.100 |
| 1.5 to 2.0 | 0.10 | +0.200 |
| 2 to 3 | 0.20 | +0.300 |
| 3 to 5 | 0.50 | +0.500 |
| 5 to 10 | 1.00 | +0.750 |
| 10 to 25 | 5.00 | +1.000 |
| At 50, 75, and 100 | ... | +1.500 |

The following solvents and demulsifiers are considered satisfactory for field testing:

Solvents
  Stoddard solvent
  Toluene
  Xylene
  Kerosine
  While gasoline
Demulsifiers
  Commercial crude oil demulsifiers
  Phenol
  Nitrogen bases
  Naphthenic acids Toluene and xylene should be saturated with water at ambient of room temperature but should be free of suspended water. Solvents are toxic and care should be exercised in suing them. Gasoline containing tetraethyl lead or deicer should never be used. When Stoddard solvent, kerosine, or white gasoline are used, they must have solvent characteristics similar to those of the crude oil being tested.

The use of a demulsifier with solvents is permitted, subject to the mutual consent of all parties concerned, when tests demonstrate that correct results cannot otherwise be determined. The type and concentration is not limited, provided the demulsifier itself does not the water and sediment. Commercial demulsifiers at a concentration of 7 ml per 1,000 ml of solvent have been successfully used.

Procedure. Fill the centrifuge tube to the 50-ml mark with solvent, then pour the well-shaken sample directly from the container into the tube until the total volume is 100 ml. Stopper the tube and shake until the contents are thoroughly mixed. Immerse the tube in a bath or dry heating device and heat the contents of the tube to 120° F. Where field conditions do not permit the use of sensitive temperature control devices, pocket-type thermometers may be used. In such cases, every effort should be made to insure a reasonably consistent bath temperature for the same oil each time it is tested.

If wax contributes to the volume of water and sediment observed, preheat the oil-solvent mixture to 140° F. before each whirling; the final temperature of the mixture should not drop below 115° F. A heated centrifuge may be required to maintain a final temperature of 115° F.

Invert the tube to assure that the oil and solvent are uniformly mixed. If shaking is necessary, proceed cautiously because the vapor pressure at 140° F. is approximately double that at 100° F. Place the tubes in the trunnion cups on opposite sides of the centrifuge to establish a balanced condition, and whirl for 3 to 10 minutes, depending on the character of the sample. The cups should be whirled at a rate, calculated from the formula, that is sufficient to produce a relative centrifugal force of between 500 and 800 at the tip of the whirling tubes (see table 6).

TABLE 6

ROTATION SPEEDS APPLICABLE FOR CENTRIFUGES OF VARIOUS DIAMETERS

| Diameter of swing in inches* | Rpm at 500 rcf | Rpm at 700 rcf |
| --- | --- | --- |
| 12 | 1,710 | 2,030 |
| 13 | 1,650 | 1,950 |
| 14 | 1,590 | 1,880 |
| 15 | 1,530 | 1,840 |
| 16 | 1,480 | 1,760 |
| 17 | 1,440 | 1,700 |
| 18 | 1,400 | 1,660 |
| 19 | 1,360 | 1,610 |
| 20 | 1,330 | 1,570 |
| 21 | 1,300 | 1,530 |
| 22 | 1,270 | 1,500 |
| 23 | 1,240 | 1,460 |
| 24 | 1,210 | 1,430 |

*Measured in inches between tips of opposite tubes when in rotating position.

Read and record the combined volume of water and sediment at the bottom of the tube to the nearest 0.05 ml from 0.1 to the 1-ml graduation and to the nearest 0.1 above the 1-ml graduation. Below 0.1 ml, estimate to the nearest 0.025 ml. If experience with the oil is limited, it is advisable to return the tube to the centrifuge without agitation and repeat the operation.

With certain types of oil, it is difficult to obtain a clean break between the oil layer and the separated water. In such cases, one or more of the following remedies may be effective:

1. Raise the temperature to 140° F.
2. Shake the mixture between whirlings in the centrifuge just sufficiently to disperse the emulsion
3. Use a different or increased amount of demulsifier, but one that does contribute to the water and sediment.
4. Use a different or increased amount of solvent.

After a satisfactory procedure for a particular type of oil has been worked out, it ordinarily is found suitable for all samples of the same type.

Calculation. Multiply the reading obtained from the graduation on the tube by two, and record the results as the percentage of water and sediment. For example, if a reading is 0.025 ml, record the percentage of water and sediment as 0.05. If a reading is 0.15 ml, record the percentage of water and sediment as 0.3. If the results are lower than 0.05 percent, record the percentage of water and sediment as either 0 or 0.05, whichever is closer.

Record. The record shall include the following:

1. the percentage of water and sediment;
2. the solvent used;
3. the type and amount of demulsifier, if used; and
4. the bath temperature.

Field Centrifuge Method, 12.50-ml Tube

This method of testing, using 12.50-ml, 100 percent centrifuge tubes for use in the determination of water and sediment in crude oil, is employed in some areas of the United States. Either a hand-powered or electrically powered centrifuge is used. Capacity, dimensions, graduations, tolerances, and markings are shown in tables 7, 8 and 9.

Molded tubes are preferred, but blown tubes, if they comply with the stipulations on uniform wall thickness, are satisfactory. All centrifuge tubes should be retempered to remove manufacturing strains. The lower end of the centrifuge tube must be clear and perfectly rounded inside, with the same thickness of glass as the main body of the tube. The solvents to be used in this method are the same as those give in the 100-ml field sampling method.

Procedure. Fill two tubes to the 50 percent mark with solvent, with or without demulsifier, and then of 100 percent mark with the oil to be tested. Stopper the tubes, shake until the contents are thoroughly mixed, place them in the centrifuge, and revolve at the rate of 1,500 revolution per minute for 3 to 10 minutes, depending on the sample. Remove the tubes, and the combined volume of water and sediment in each tube to the nearest 0.1 percent.

TABLE 7

CAPACITY OF 12.5-ml CENTRIFUGE TUBE

| Indicated percentage | Milliliters |
|---|---|
| 1 | 0.125 |
| 2 | 0.250 |
| 3 | 0.375 |
| 5 | 0.625 |
| 10 | 1.250 |
| 15 | 1.875 |
| 20 | 2.500 |
| 25 | 3.125 |
| 30 | 3.750 |
| 35 | 4.375 |
| 40 | 5.000 |
| 45 | 5.625 |
| 50 | 6.250 |
| 100 | 12.500 |

TABLE 8

SPECIFICATIONS FOR 12.50-ml CENTRIFUGE TUBE

Graduations
Graduations shall be marked as follows:

| | |
|---|---|
| 0 to 3 percent | 0.2 of 1 percent |
| 3 to 10 percent | 0.5 of 1 percent |
| 10 to 50 percent | 1 percent |
| 50 to 100 percent | blank |

Specifications

Length, overall: 118 ± 2 mm

TABLE 8-continued

SPECIFICATIONS FOR 12.50-ml CENTRIFUGE TUBE

Length, 0 to 50 percent: 66 ± 4 mm
Length, 50 to 100 percent: 35 ± 3 mm
Length, tapered part: 56 to 62 mm
Length, untapered part: 58 to 60 mm
Rim thickness: 2 to 3 mm: included in overall measurement
Diameter, untapered: 17 ± 0.25 mm
Diameter, bottom, at the 0.3 percent marking: 5 ± 1 mm
Normal thickness: perfect semicircle bottom

TABLE 9

TOLERANCES FOR 12.50 ml TUBE

| Range (percent) | Tolerance (percent) | Volumetric capacity (ml) |
|---|---|---|
| 0 to 1 | ±0.10 | ±0.0125 |
| 1 to 2 | ±0.15 | ±0.0188 |
| 2 to 3 | ±0.20 | ±0.0250 |
| 3 to 5 | ±0.20 | ±0.0250 |
| 5 to 10 | ±0.40 | ±0.0500 |
| 10 to 25 | ±0.50 | ±0.0625 |
| 25 to 50 | ±1.00 | ±0.1250 |
| 50 to 100 | ±1.00 | ±0.1250 |

Replace the tubes in the centrifuge and revolve again for from 3 to 10 minutes. Again record the combined water and sediment. If there is a difference of more than 0.2 percent between the first and second readings, continue centrifuging until two consecutive readings check within 0.2 percent.

Calculation. The sum of the final readings on the two 12.50-ml centrifuge tubes represents the volume percentage of water and sediment in the crude oil tested.

Report. The report shall include the following:

1. the percentage of water and sediment;
2. the solvent used; and
3. the type and amount of demulsifier, if used.

Material taken from "Treating Oil Field Emulsions," Third Edition issued by Petroleum Extension Service, The University of Texas at Austin, Austin, Tex. and American Petroleum Institute, Division of Production, Dallas, Tex. 1974.

What is claimed is:

1. A process for treating iron containing sludge/emulsion formed by acidizing oil and/or gas wells comprising:

adding an iron-control chemical to the sludge/emulsion in an amount sufficient to prevent oxidation of ferrous iron to ferric iron and reduce already present ferric iron to ferrous iron;

adding a water dispersible emulsion breaker to the sludge/emulsion in an amount sufficient to separate the sludge/emulsion into water and oil;

treating said water with a water clarifier; and subjecting said water with a water clarifier to a separation process comprising prefiltering said water and passing said water through a resin media.

2. A process according to claim 1, wherein said water clarifier is added to the water in an amount sufficient to clarify the water to a purity of less than about 29 mg/L organic material.

3. A process according to claim 1, wherein the resin media comprises a macroreticular resin media.

4. A process according to claim 1, wherein said iron-control chemical comprises a chelating agent.

5. A process according to 4, wherein said chelating agent comprises sodium or potassium salts of ethylenediaminetetraacetic acid, sodium or potassium salts of hydroxyethylethylenediaminetetraacetic acid, or sodium or potassium salts of nitrilotriacetic acid.

6. A process according to claim 1, wherein said iron-control chemical comprises a salt containing bisulfite ions.

7. A process according to claim 1, wherein said emulsion breaker comprises dodecylbenzylsulfonic acid, the sodium salt of xylenesulfonic acid, alkyoxylated compounds, anionic cationic and nonionic surfactants, or resins.

8. A process according to claim 7, wherein said resins comprise phenolic or epoxide resins.

9. A process according to claim 1, wherein said water clarifier comprises organic polymers.

10. A process according to claim 9, wherein said organic polymers comprise polyacrylic acid, acrylic acid based polymers, acrylamide based polymers, polymerized amines, alkanolamines, thiocarbamates or cationic polymers.

11. A process according to claim 1, wherein said water clarifier comprises inorganic metal salts.

12. A process according to claim 11, wherein said inorganic metal salts comprise alum, aluminum chloride, or aluminum chlorohydrate.

13. A process according to claim 1, wherein said iron-control chemical comprises thioglycolic acid.

14. A method for treating production fluid containing sludge/emulsion formed by acidizing oil and/or gas wells comprising:
   adding 500 to 10,000 ppm of an iron-control chemical to the production fluid;
   adding 125 to 5,000 ppm of a water soluble emulsion breaker to the production fluid;
   pumping the fluid through a test separator;
   adding about 1000 to about 100,000 ppm of a water clarifier to the fluid;
   pumping the fluid to a settling vessel and allowing the fluid to separate into an oil phase and a water phase;
   pumping the water phase through a macroreticular resin held in a macroreticular resin unit;
   testing the water phase to determine if it is of sufficient quality to release in the ocean, wherein said sufficient quality comprises less than about 29 mg/L organic material;
   separating the water phase that is of sufficient quality from the water phase that is not of sufficient quality; and
   releasing the water phase that is of sufficient quality into the ocean.

15. A method according to claim 14, wherein the water phase that is not of sufficient quality is returned to the settling vessel for a sufficient time for the oil phase to separate from the water phase;
   passed through the macroreticular resin held in a macroreticular resin unit;
   tested to determine if it is of sufficient quality to release in the ocean;
   released into the ocean if it is of sufficient quality; and
   returned to the settling vessel if it is not of sufficient quality.

16. A method according to claim 14, wherein the water phase is passed through a prefilter after leaving the settling vessel and before entering the macroreticular resin unit.

17. A method for treating an iron-containing sludge/emulsion, comprising the steps of:
   adding an iron-control chemical and an emulsion breaker to said sludge/emulsion, wherein said iron-control chemical is added in an amount sufficient to prevent oxidation of ferrous iron to ferric iron and reduce already present ferric iron to ferrous iron;
   passing said sludge/emulsion through a settling vessel and allowing the sludge/emulsion to separate into a water phase and an oil phase;
   filtering said water phase through a prefilter;
   filtering said water phase through a resin media; and
   analyzing said water phase for purity, wherein said water phase having a purity of less than 29 mg/L oil is discharged at sea, and wherein said water phase having a purity of more than 29 mg/L oil is recycled through said prefilter and said resin media until said water phase comprises a purity of less than 29 mg/L oil.

18. The method of claim 17, further comprising adding a water clarifier to said sludge/emulsion before passing said sludge/emulsion through said settling vessel.

19. The method of claim 18, wherein said water clarifier comprises polyacrylic acid.

20. The method of claim 18, wherein said water clarifier is added to said sludge/emulsion in an amount of from about 1,000 ppm to about 100,000 ppm.

21. The method of claim 17, wherein said iron-control chemical comprises thioglycolic acid.

22. The method of claim 17, wherein said iron-control chemical is added to said sludge/emulsion in an amount of from about 500 ppm to about 10,000 ppm.

23. The method of claim 17, wherein said emulsion breaker comprises a combination of dodecylbenzylsulfonic acid and the sodium salt of xylenesulfonic acid.

24. The method of claim 17, wherein said emulsion breaker is added to said sludge/emulsion in an amount of from about 125 ppm to about 5,000 ppm.

* * * * *